(12) United States Patent
Nadherny et al.

(10) Patent No.: US 6,481,941 B2
(45) Date of Patent: Nov. 19, 2002

(54) LADING TIE ANCHOR

(75) Inventors: Rudolph E. Nadherny, Golden, MO (US); Peter R. Sutcliffe, Lyons, CO (US)

(73) Assignee: Ireco, LLC, Chicago, IL (US)

( * ) Notice: Subject to any disclaimer, the term of this patent is extended or adjusted under 35 U.S.C. 154(b) by 0 days.

(21) Appl. No.: 09/760,014

(22) Filed: Jan. 12, 2001

(65) Prior Publication Data

US 2002/0094252 A1 Jul. 18, 2002

(51) Int. Cl.[7] .................................................. B60P 7/08
(52) U.S. Cl. ........................ 410/114; 410/115; 410/106; 410/110; 410/108; 410/109; 410/112; 410/113; 410/116
(58) Field of Search ................................ 410/115, 114, 410/106, 110, 108, 109, 112, 113, 116; 105/355; 24/115 K, 129 K, 265 CD; 248/499

(56) References Cited

U.S. PATENT DOCUMENTS

| | | | |
|---|---|---|---|
| 2,623,477 A | | 12/1952 | Tuttle |
| 2,661,704 A | * | 12/1953 | Johnson ...................... 410/112 |
| 2,716,382 A | | 8/1955 | Johnson |
| 2,753,816 A | * | 7/1956 | Oakley ....................... 410/114 |
| 2,803,201 A | | 8/1957 | Johnson et al. |
| 2,839,013 A | * | 6/1958 | Gunnell et al. ............. 410/113 |
| 2,843,060 A | | 7/1958 | Sladek ........................ 410/112 |
| 2,855,866 A | * | 10/1958 | Adler ......................... 410/114 |
| 2,939,406 A | * | 6/1960 | Wilkoff ...................... 410/115 |
| 2,989,010 A | * | 6/1961 | Wilkoff ...................... 410/115 |
| 3,089,436 A | | 5/1963 | Buckley |
| 3,125,036 A | * | 3/1964 | Reynolds .................... 410/114 |
| 3,179,068 A | | 4/1965 | Jensen |
| 3,831,532 A | | 8/1974 | Smith et al. |
| 4,266,897 A | | 5/1981 | Jensen |
| 5,848,865 A | | 12/1998 | Beals |
| 5,943,963 A | | 8/1999 | Beals |

* cited by examiner

Primary Examiner—Stephen T. Gordon
(74) Attorney, Agent, or Firm—Cook, Alex, McFarron, Manzo, Cummings & Mehler, Ltd.

(57) ABSTRACT

A lading tie anchor for use in a railway boxcar having an interior metal lining, the lining having an aperture or indentation formed therein for receipt of the anchor, with the anchor comprising a one-piece body adapted to be received or seated in the opening or indentation in the metal lining. The anchor has at least two opposed edge portions that define a central opening, with the edge portions engaging the metal lining. A continuous, vertically-orientated anchoring post spans the central opening, the post including an aperture or drain hole in its lower portion to facilitate the transportation of liquid from the anchor into the aperture or indentation in the metal lining.

14 Claims, 8 Drawing Sheets

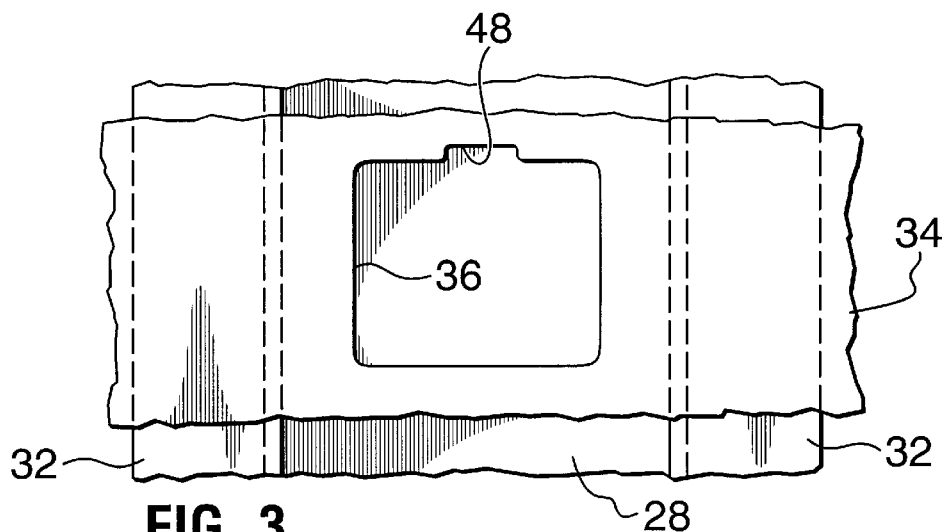
FIG. 3
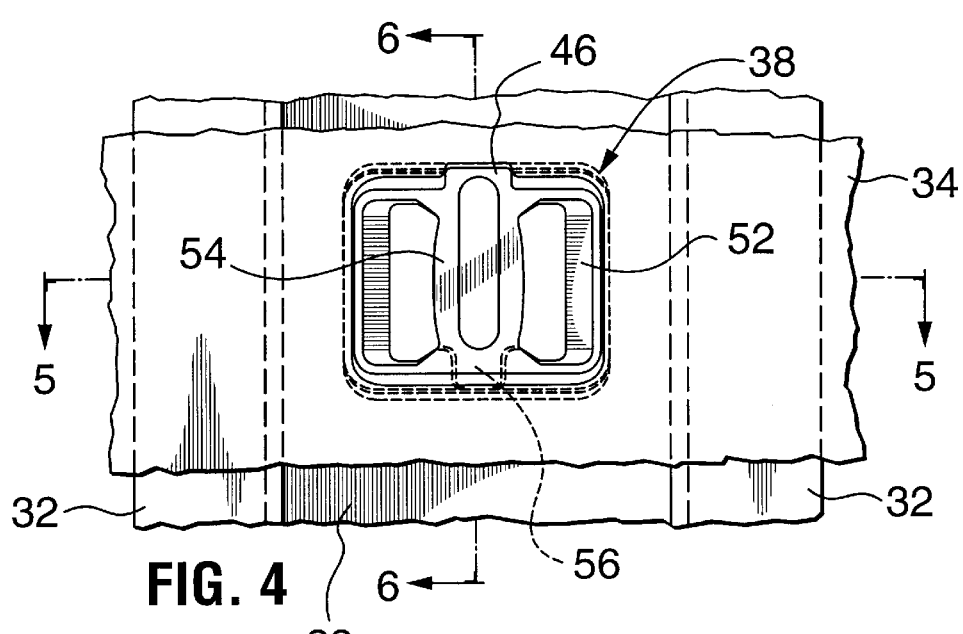
FIG. 4
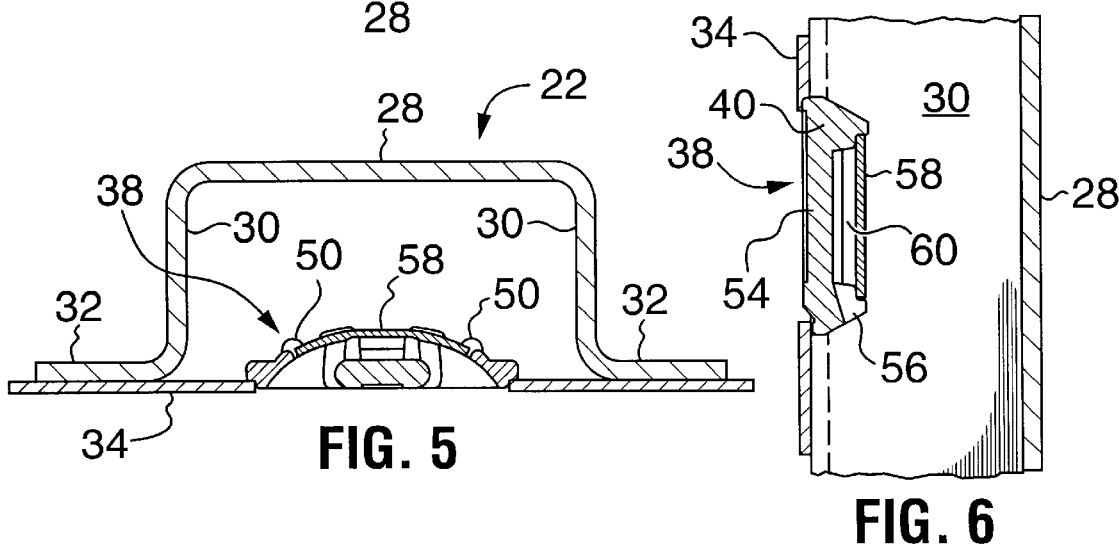
FIG. 5
FIG. 6

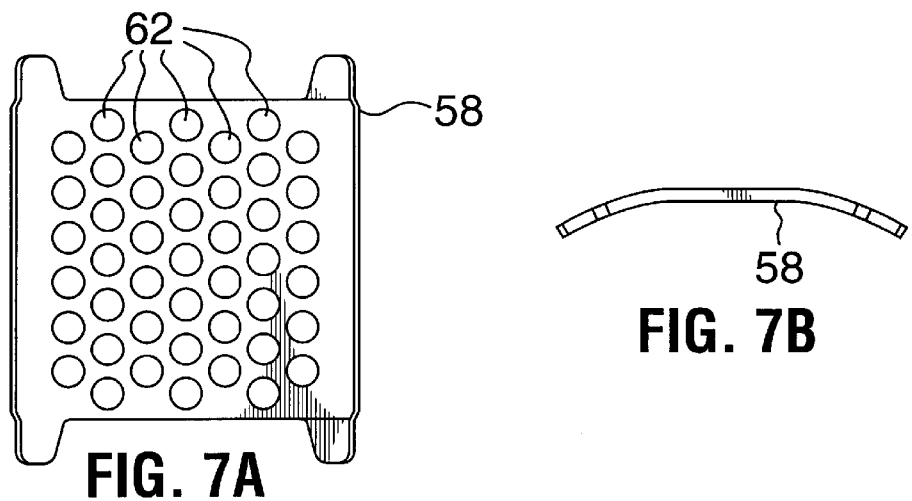
FIG. 7A
FIG. 7B
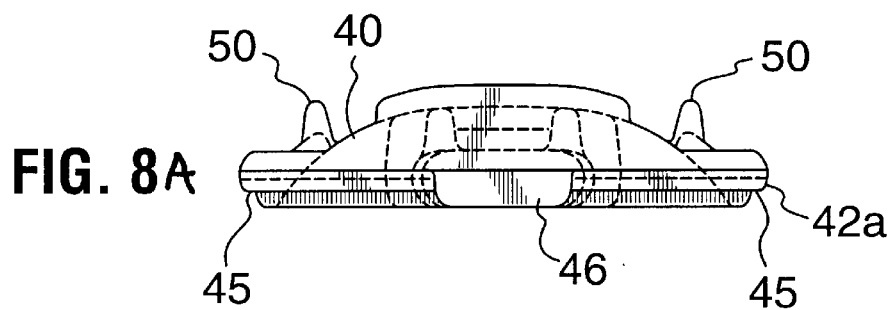
FIG. 8A
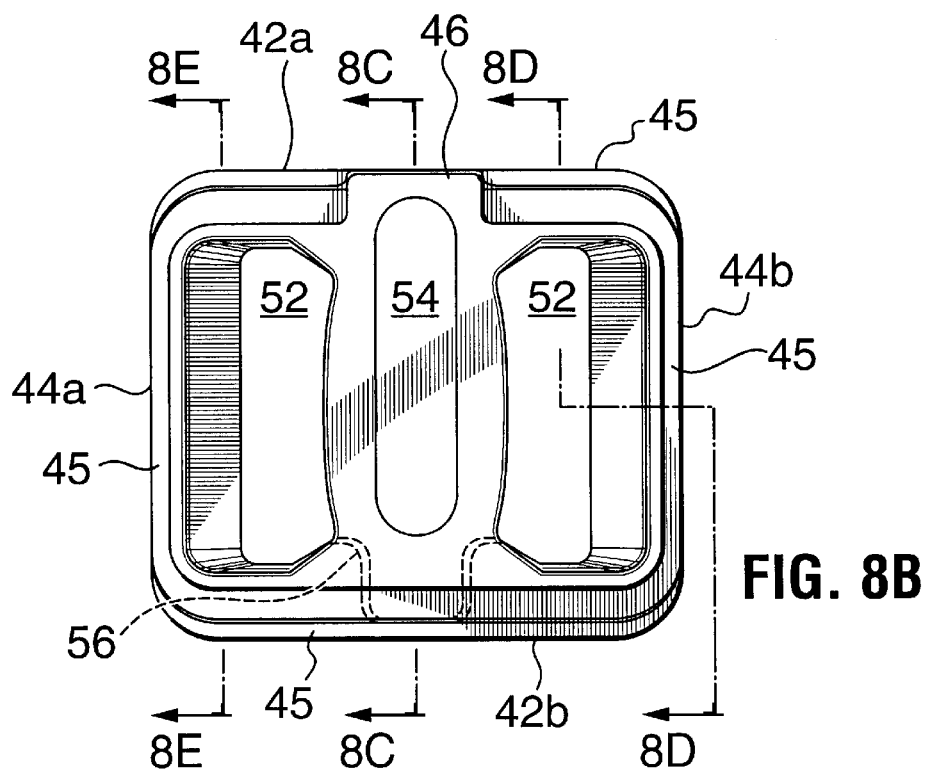
FIG. 8B

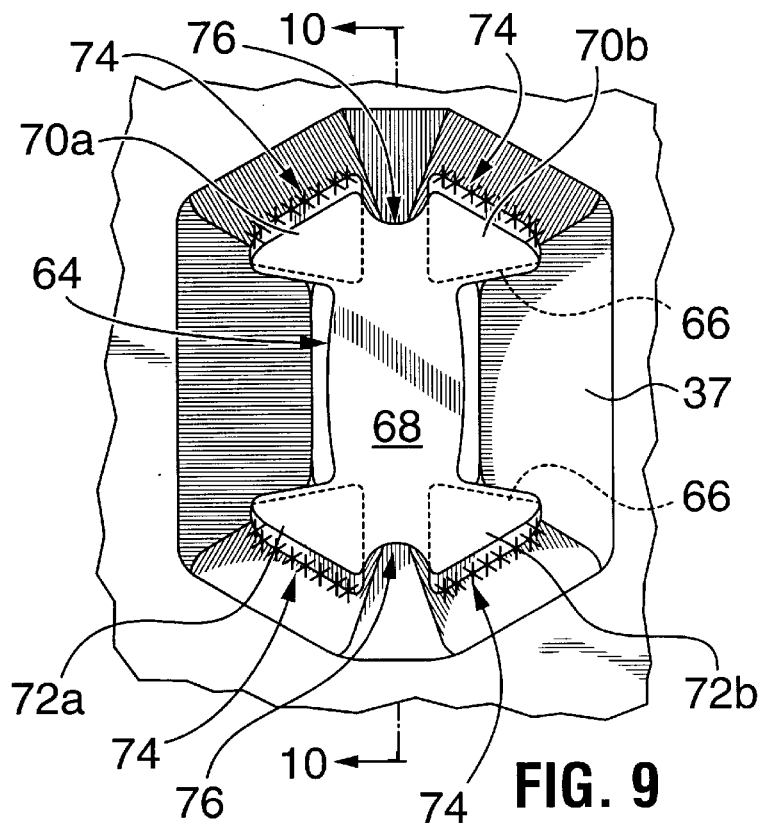 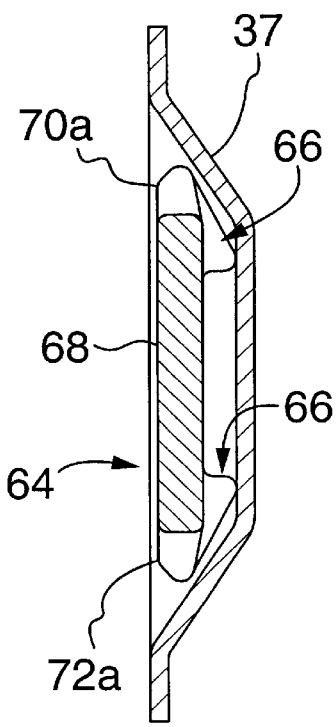
FIG. 9  FIG. 10
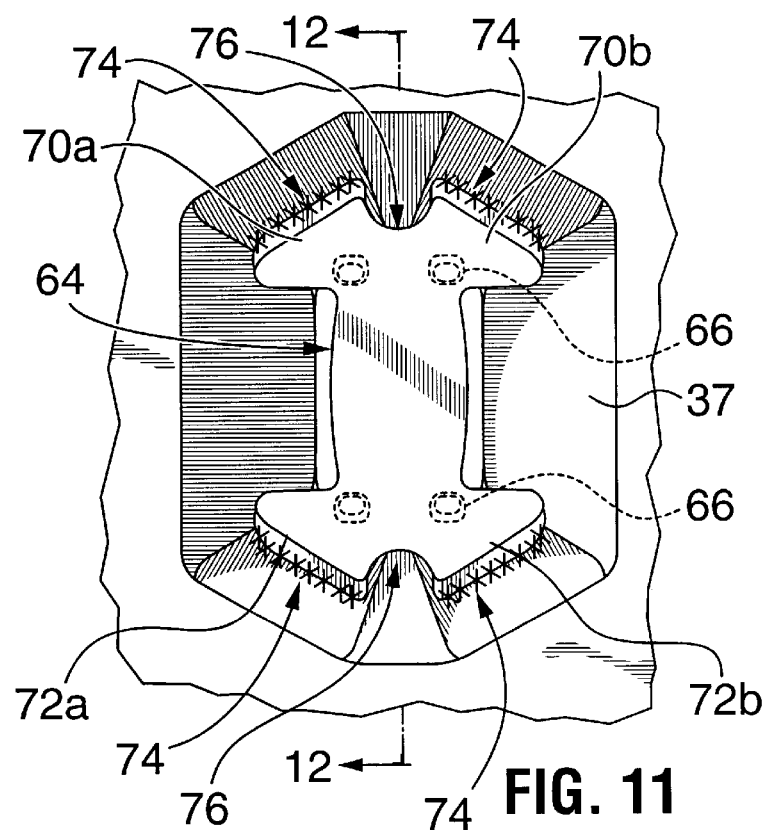 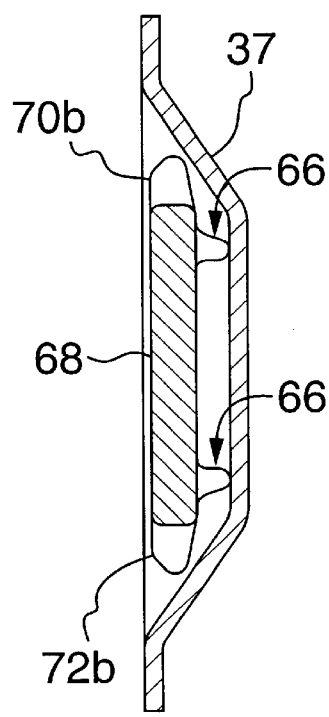
FIG. 11  FIG. 12

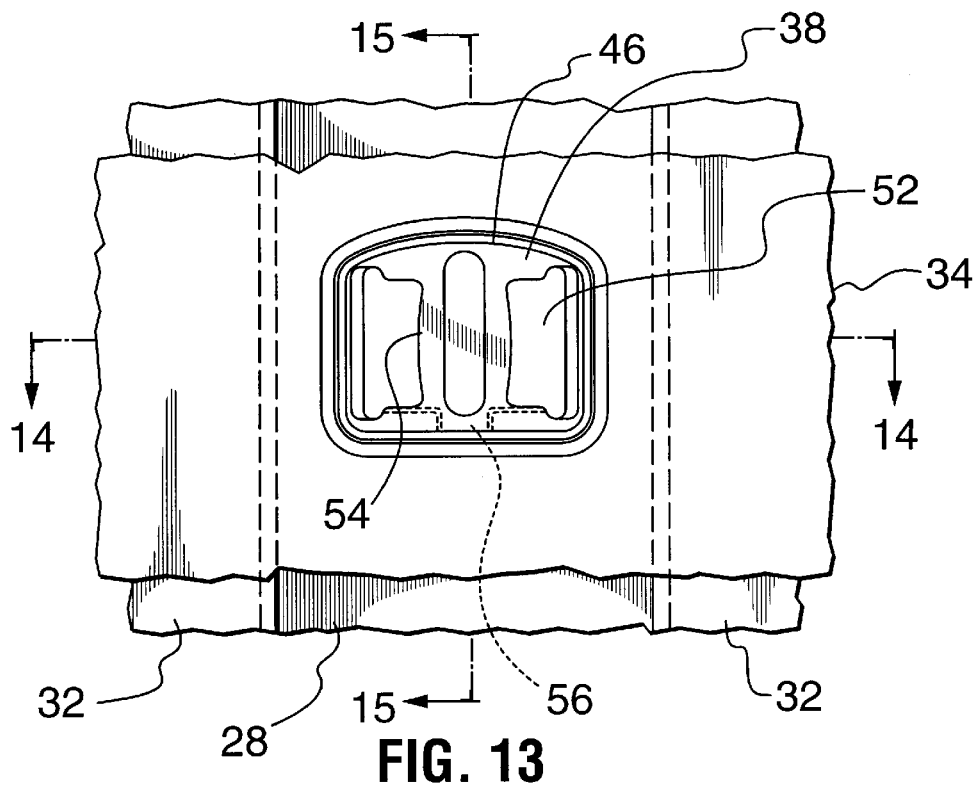
FIG. 13
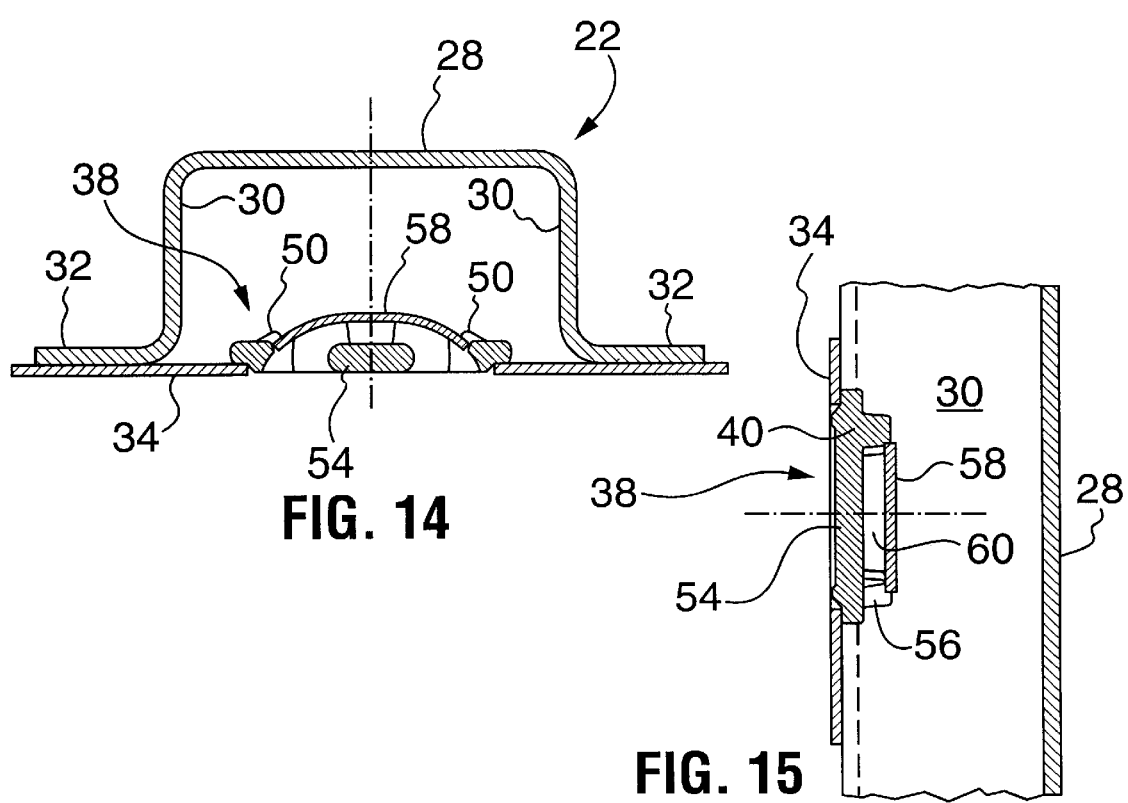
FIG. 14
FIG. 15

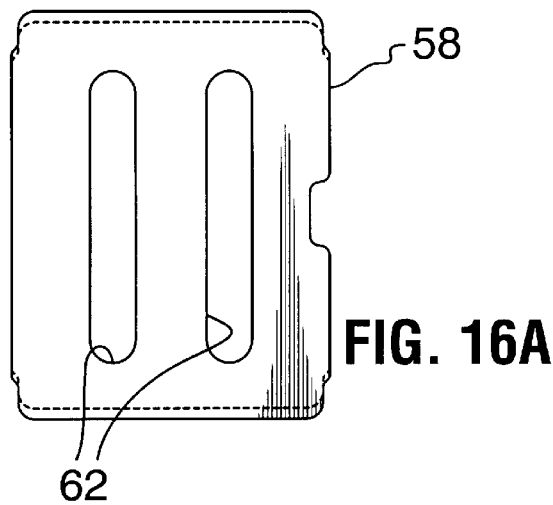
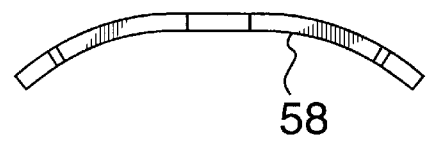
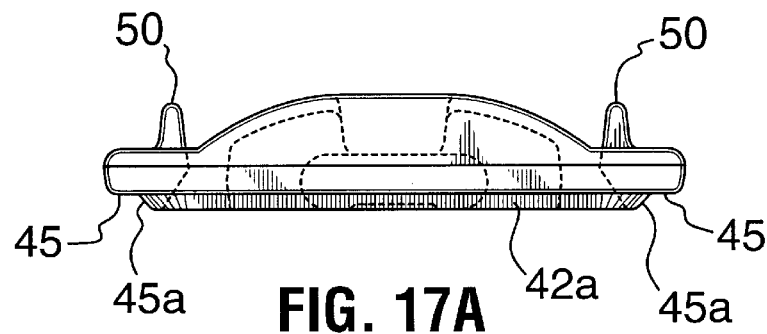
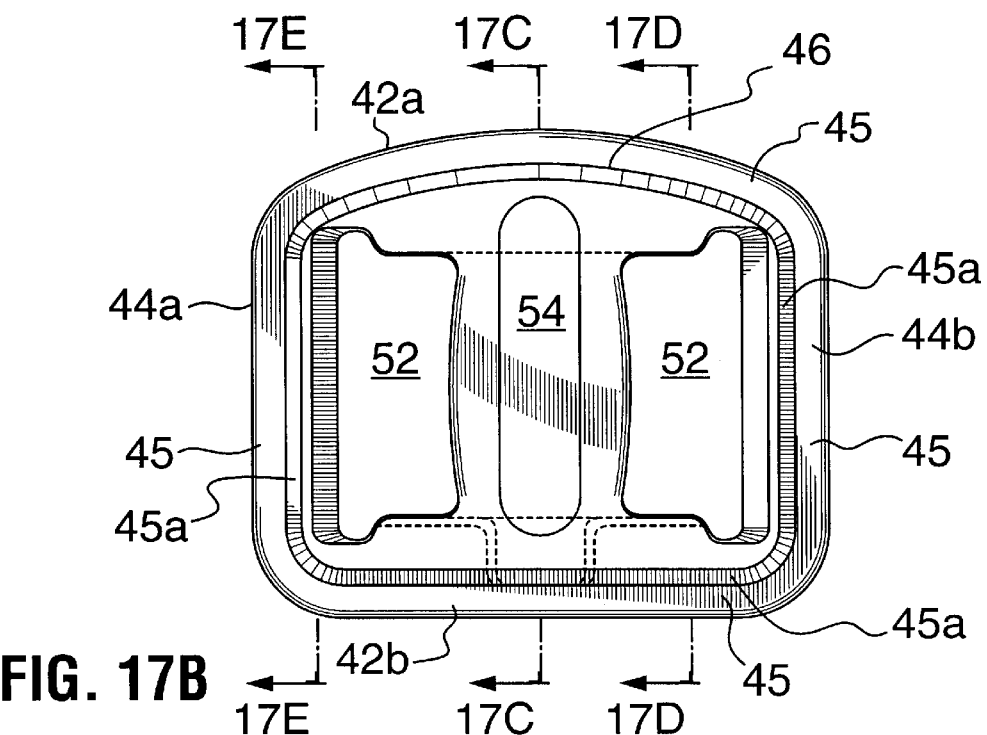

LADING TIE ANCHOR

BACKGROUND OF INVENTION

The present invention generally relates to lading tie anchors typically used in the interior of railroad boxcars, moving vans, and the like, to facilitate securing the cargo carried therein and, more particularly, to an improved lading tie anchor that reduces the likelihood of water and rust damage to the cargo and anchor.

Products that are shipped by railway boxcars are often secured to the sidewalls or linings and/or floor that define the interior of the boxcar by means of lading straps or other flexible cargo binding elements. To this end, the interior of the boxcar is often fitted with anchoring devices, commonly called lading tie anchors, for receiving the lading straps. See, e.g., U.S. Pat. No. 3,179,068, which is incorporated herein by reference. This patent shows a freight car construction employing a plurality of one-piece lading tie anchors that have a central opening and an anchoring post extending either partially or fully across the central opening. The anchors are applied to the wall of the freight car, with a lading strap being capable of being wrapped around and secured to the post.

Such lading tie anchors may be retrofitted to existing freight cars or installed during the original manufacture of the freight car (commonly called "OEM" application). Retrofitting typically requires forming a hole in the interior steel lining of the boxcar, with the hole generally opening into a channel formed by a reinforcing side post secured to the exterior of the lining. The anchors are then fitted into the hole in the steel lining. In OEM (and occasional retrofit) applications, the lining typically includes an indentation or deformation stamped into it for seating the anchor. In either case, the anchor is typically welded in place to the steel lining.

While such lading tie anchors function well for securing cargo within the boxcars, the configuration of these anchors is such that moisture due to condensation and the like may collect in the anchor, leading to rust and corrosion of the anchor. The rust may be transferred to the cargo secured by means of the anchors, thus discoloring or otherwise spoiling the cargo. This has been a particular problem in the transportation of paper pulp. Such pulp is shipped "wet". Consequently, a significant amount of moisture may form on the interior of the railway cars used to ship the pulp due to condensation. This condensation collects in the lading tie anchor, promoting rust, which is then transferred to the pulp. The paper pulp is then generally unsuitable for its intended use.

Accordingly, it is the principal object of the present invention to provide a lading tie anchor that is less likely to transfer rust or other contaminants to the cargo secured thereby.

It is a further object to provide a lading tie anchor that is for both retrofit and OEM applications to a freight car.

It is a still further object to provide a lading tie anchor that is adapted to direct any moisture away from the interior of the freight car.

SUMMARY OF THE INVENTION

These objects, as well as other that will become apparent upon reference to the following detailed description and accompanying drawings, are accomplished by a lading tie anchor for use in a railway boxcar having an interior metal lining, the lining having an aperture (for retrofit application) or indentation (for OEM application) formed therein for receipt of the anchor, with the anchor comprising a one-piece body adapted to be received or seated in the opening or indentation in the metal lining. The anchor has at least two opposed edge portions that define a central opening, with the edge portions engaging the metal lining. A continuous, vertically-orientated anchoring post spans the central opening, the post including an aperture or drain hole in its lower portion to facilitate the transportation of liquid from the anchor into the aperture or indentation in the metal lining.

In a preferred embodiment, the lading tie anchor includes a backing plate secured to the body that defines, in conjunction with the anchoring post a slot for receiving a lading tie. The backing plate may include a hole or series of holes to further promote moisture transfer. The anchor may also include a continuous outer edge with a lip formed therein for receiving the edge of the metal lining defined by the aperture typically encountered in retrofit application of the anchor.

In a second embodiment particularly suited for OEM applications, the anchor has a "dog bone" configuration, with the opposed edge portions each comprising a pair of flanges that provide a surface for welding the anchor to the lining. The anchor includes a drainage hole at each end, between each of the two mounting flanges, to permit liquid to escape from the indentation typically found in OEM applications in which the anchor is mounted.

BRIEF DESCRIPTION OF THE DRAWINGS

FIG. 3 is a fragmentary view in front elevation and on an enlarged scale showing a part of the interior lining of a freight car with a hole cut into it for receipt of lading tie anchor;

FIG. 4 is a fragmentary view in front elevation and on an enlarged scale showing one of the lading tie anchors according to the present invention in the car sidewall of FIG. 1;

FIG. 5 is a horizontal section taken along line 5—5 of FIG. 4;

FIG. 6 is a vertical section taken along line 6—6 of FIG. 4;

FIG. 7A is a front elevation of a backing plate that forms part of the lading tie anchor of the present invention;

FIG. 7B is a top view of the backing plate of FIG. 7A;

FIG. 8A is a top view of the body portion of the lading tie anchor according to the present invention;

FIG. 8B is a front elevation of the body portion of the lading tie anchor of FIG. 8A;

FIG. 9 is a front elevation of a second embodiment of a lading tie anchor according to the present invention with the anchor located in an indentation in the lining of the freight car;

FIG. 10 is a vertical section taken along line 10—10 of FIG. 9;

FIG. 11 is a front elevation of a third embodiment of a lading tie anchor according to the present invention with the anchor located in an indentation in the lining of the freight car;

FIG. 12 is a vertical section taken along line 12—12 of FIG. 11;

FIG. 13 is a fragmentary view in front elevation showing a fourth embodiment of a lading tie anchor according to the present invention in the car sidewall of FIG. 1;

FIG. 14 is a horizontal section taken along line 14—14 of FIG. 13;

FIG. 15 is a vertical section taken along line 15—15 of FIG. 13;

FIG. 16A is a front elevation of a backing plate for use in conjunction with the lading tie anchor of FIG. 13;

FIG. 16B is a top view of the backing plate of FIG. 16A;

FIG. 17A is a top view of the body portion of the lading tie anchor of FIG. 13;

FIG. 17B is a front elevation of the body portion of the lading tie anchor of FIG. 13;

DETAILED DESCRIPTION OF THE PREFERRED EMBODIMENTS

Figure 1:
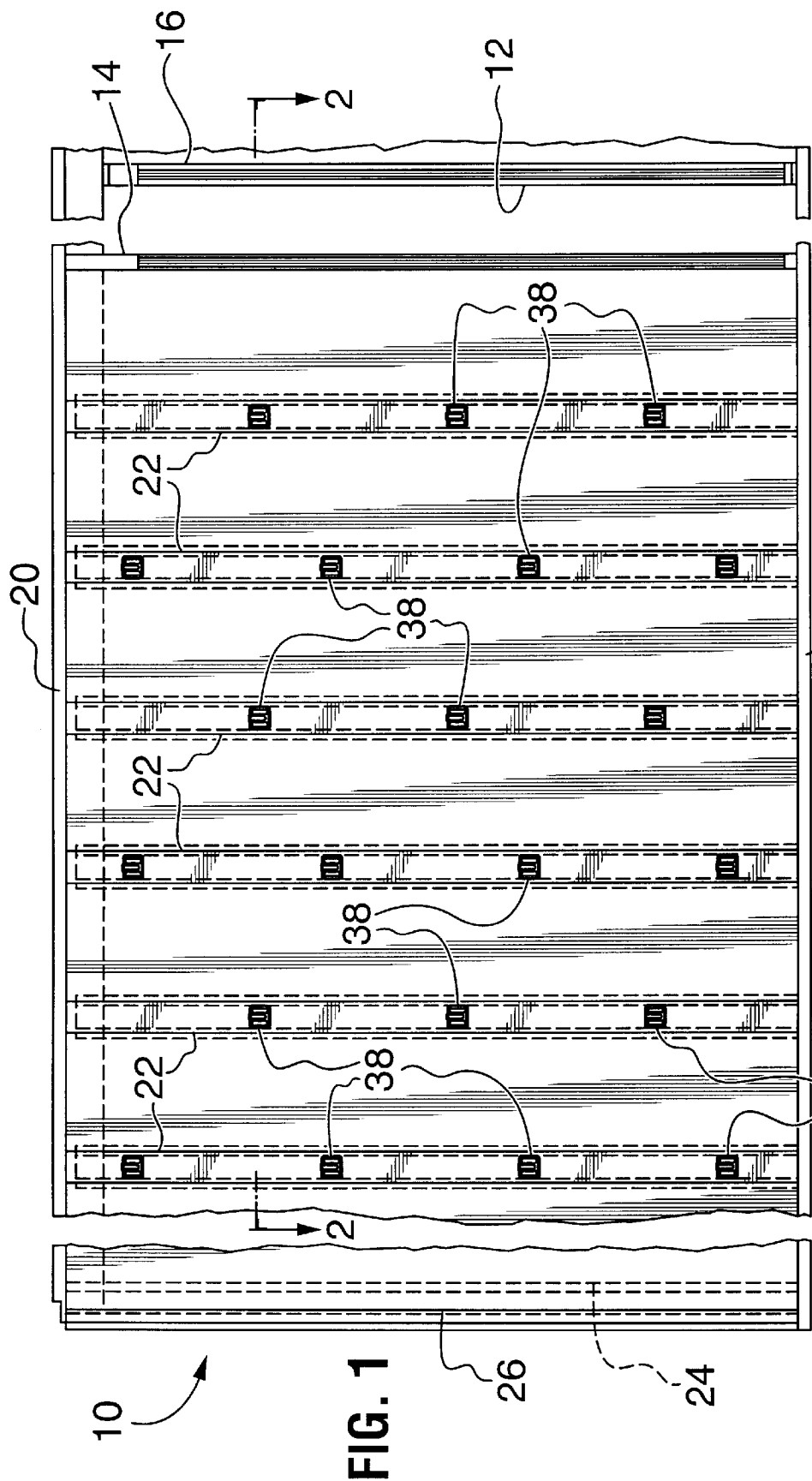
FIG. 1 is a view of the inside of a freight car, partly broken away showing a vertical plan of one part of the car sidewall, including the doorway on the right and a portion of the end wall on the left.
Figure 2:
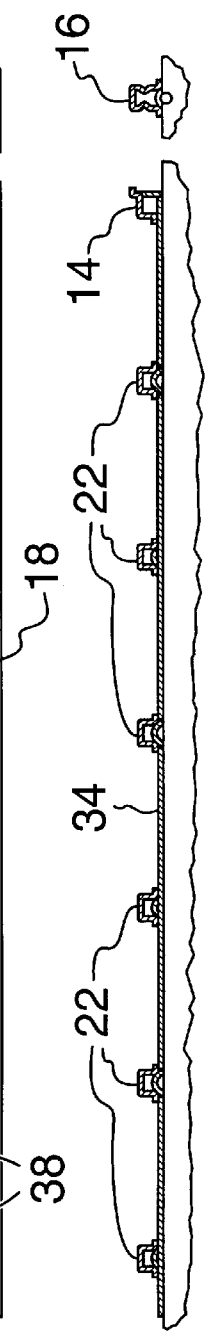
FIG. 2 is a horizontal sectional view taken generally along line 2—2 of FIG. 1.
Figure 8C:
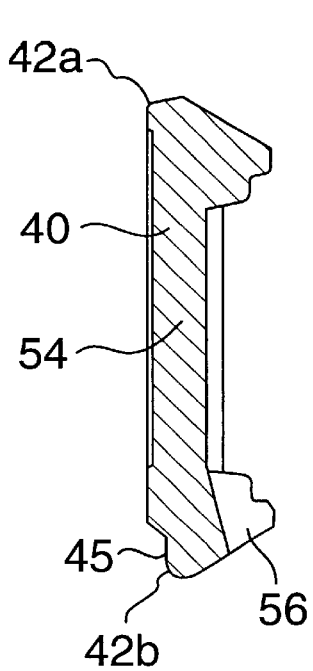
FIGS. 8C, 8D and 8E are sectional views taken generally along lines 8C—8C, 8D—8D and 8E—8E of FIG. 8B.
Figure 8D:
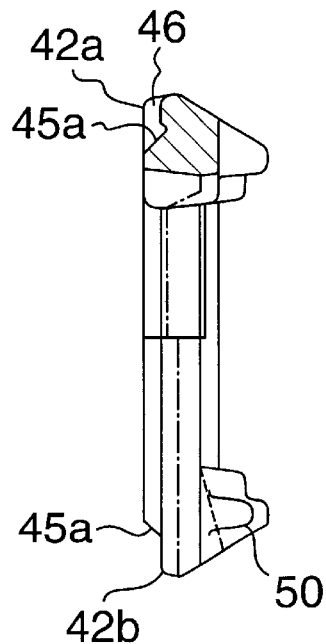
Figure 8E:
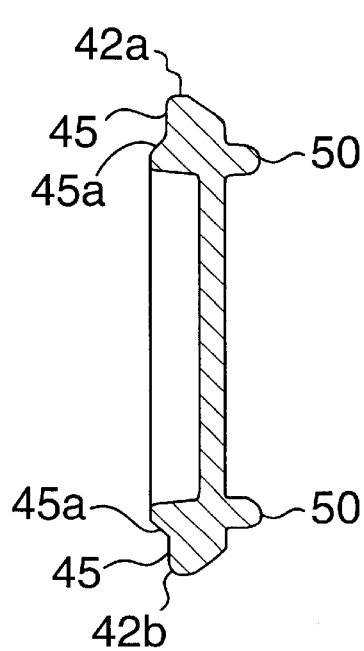
Figure 8F:
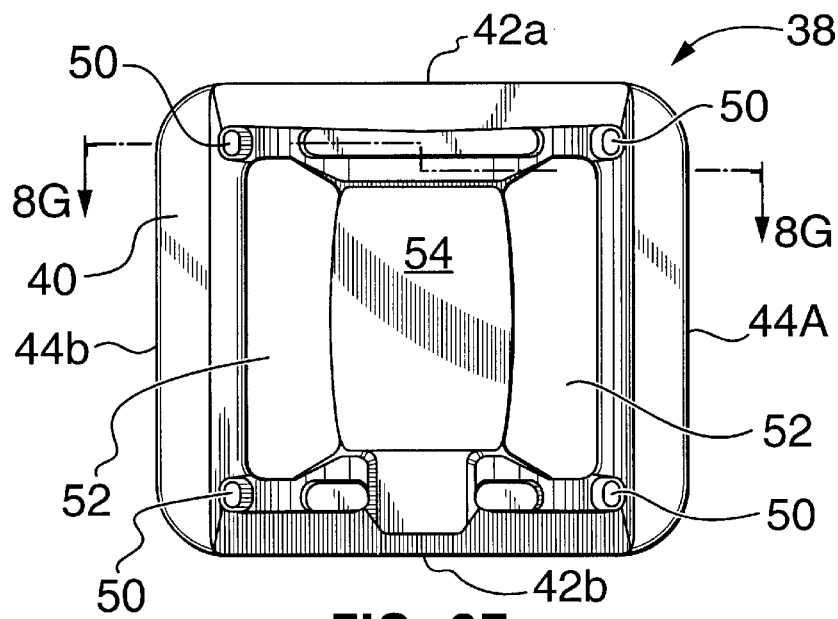
FIG. 8F is a back elevation of the body portion of the lading tie anchor.
Figure 8G:
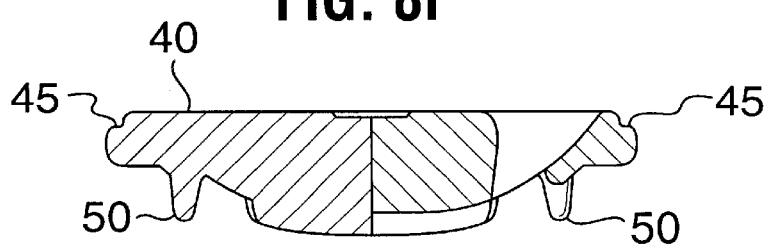
FIG. 8G is a sectional view taken along line 8G—8G of FIG. 8F.
Figure 17C:
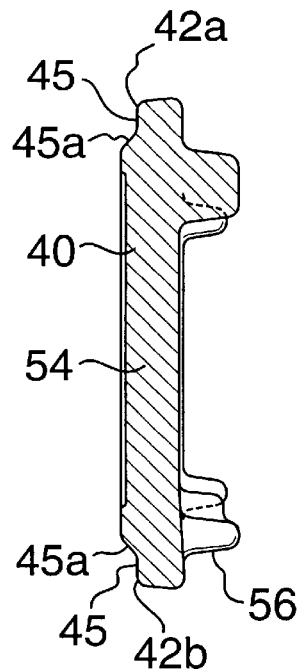
FIGS. 17C, 17D and 17E are sectional views taken generally alone lines 17C—17C, 17D—17D and 17E—17E of FIG. 17B.
Figure 17D:
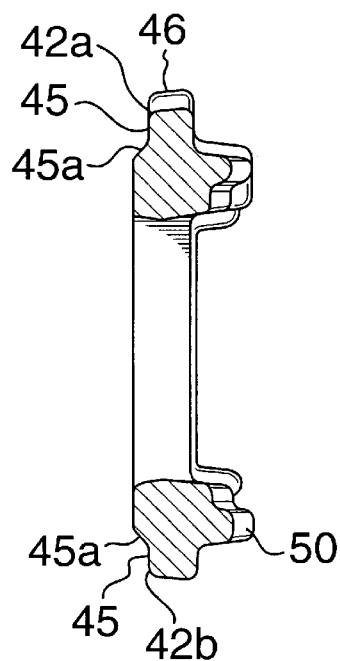
Figure 17E:
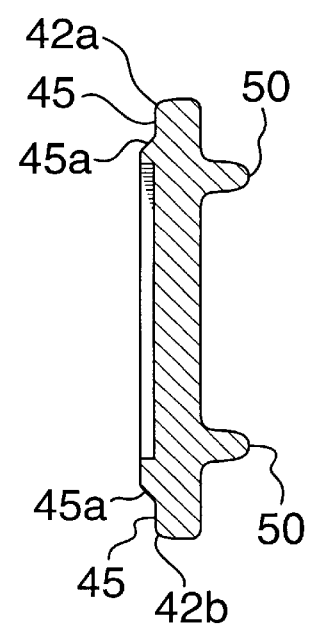
Figure 17F:
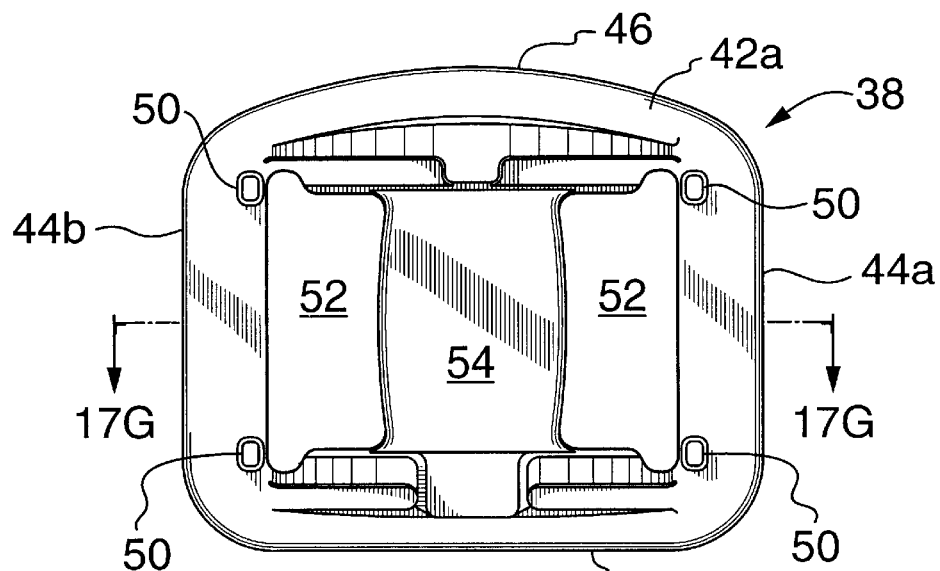
FIG. 17F is a back elevation of the body portion of the lading tie anchor of FIG. 13.
Figure 17G:
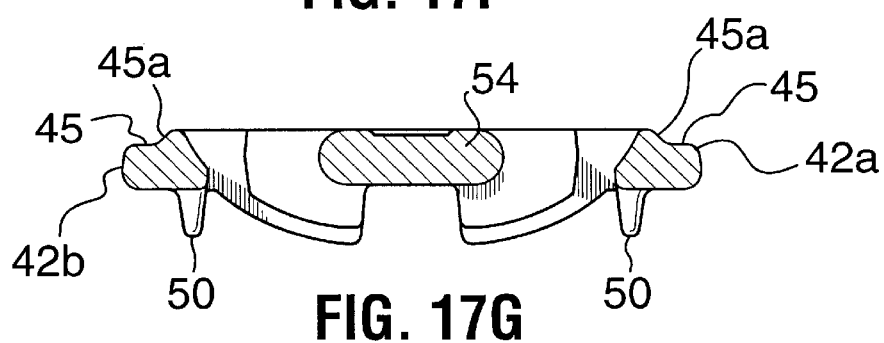
FIG. 17G is a sectional view taken along line 17G—17G of FIG. 17F.

With reference to FIGS. 1 and 2, the general environment for the present invention is shown. In these figures, a portion of the interior wall of a freight boxcar, indicated generally by 10, includes a door opening 12 at the right which is located between upstanding metallic door posts 14 and 16. The wall 10 extends upwardly from a floor 18 to a top 20. Intermediate metallic car side posts 22 are positioned in vertical spaced relationship along the wall 10 between the door post 14 and a metallic corner post 24 to which an end wall section 26 is joined at a right angle to the side wall.

Referring to FIG. 5, each side post 22 is generally channel-shaped or hat-shaped in cross section. The side post 22 has a flat rearwall 28 and side walls 30, the distal ends of which have out-turned flanges 32. It is conventional to form the car side post 22 of 3/16–1/4 inch thick sheet steel.

Attached to the posts 22 and joined at opposite ends to the door post 14 and corner post 24 is a wall plate or steel lining 34 which is secured by welding to the flanges 32 of the side posts 22. The wall plate 34 and posts 22 combine to provide one of the interior walls of the freight car.

In retrofit and some OEM applications, vertical strips or rows of cutouts 36 (best seen in FIG. 3) are formed in the wall plate 34 for receipt of a lading tie anchor in those portions of the steel lining 34 that overlie a side post 22. Alternatively, for many OEM applications, a vertical strip or row of a generally hexagonally deformed indentations 37 (see FIGS. 9–12) is formed in a known manner in the wall plate 34 such as by a suitable die, the indentation being sized to seat the lading tie anchor.

With reference to FIGS. 4–8A–G, the lading tie anchor 38 includes a one-piece body portion 40 that is sized to be received in the cutout 36 in the metal wall plate 34 that forms the interior lining of the boxcar. The one-piece body 40 includes two pairs of opposed edge portions 42A, 42B and 44A, 44B. These edges engage the wall plate 34 at the cutout 36 to properly locate and mount the anchor in the hole. To insure proper orientation of the anchor in the cutout 36, the anchor preferably is asymmetrical about a horizontal axis. Specifically, the anchor includes a tab 46 on edge 42A. This tab 46 mates in a notch 48 in the cutout 36, thus insuring the proper orientation of the anchor.

Preferably, the body 40 is formed with a lip 45 in the opposed edges 42A, 42B, 44A, 44B that help to nest the anchor in the cutout 36. The lip 45 on opposed edges 42a, 42b is preferably formed with a sloping shoulder 45a (see, e.g., FIG. 8E) that assists in locating the anchor in the cutout 36. The shoulder 45a preferably forms an angle of approximately 45° with respect to the lip.

Further, as best seen in FIGS. 5 and 6, when the anchor is properly affixed to the wall plate 34, it does not extend out into the interior of the car. It is substantially recessed within the opening and presents a generally flush surface. This prevents, or at least minimizes the likelihood of, the anchor from coming into damaging contact with any of the contents transported within the car.

The opposed edges 42A, 42B, 44A, 44B of the body portion define a central opening 52 in the body that is bridged by a continuous, vertically-orientated anchoring post 54. The anchoring post 54 is adapted to receive a lading tie, by means of wrapping a lading tie around the post or a webbing tie support clip.

In keeping with the invention, the body portion 40 permits the drainage of any condensation that may form in the anchor away from the anchor, thus reducing the likelihood of anchor corrosion and rusting. To this end, the body portion 40 includes a drainage hole 56 at the bottom of the anchor post 54 where it connects into edge 42b of the body. As best seen in FIGS. 4 and 6, the drainage hole 56 is disposed on the interior of the channel defined by the side post 22, thus permitting any liquid to be directed away from the interior of the freight car.

In keeping with a further aspect of the invention, the anchor 38 may be provided with a backing plate 58. The backing plate 58 in combination with the anchoring post 54 defines a slot 60 (best seen in FIG. 6) for receiving the lading tie. The backing plate 58 also effectively closes the central opening 52 to guide the lading tie under and around the anchoring post 54 and prevents the lading tie from being misdirected into the channel defined by the side post 22.

The backing plate 58 may also be provided with an opening or with a series of perforations 62. When provided, such opening or perforations further permit the transfer of any moisture or condensation away from the anchor and into the side post. As best seen in FIG. 7A, the perforations 62 are in staggered alignment. Preferably each of the perforations 62 is approximately 3/16 inch in diameter. The body portion 40 may also be formed with a series of projections 50 extending from the backside of the body. These projections locate and secure the backing plate onto the anchor body. Specifically, during assembly a coin die may be used to crimp these projections onto the backing plate. Alternatively, the backing plate may be tack welded to the body. The body of the anchor may be made of drop forged steel, stainless steel, cast steel, or the like, while the backing plate may be made of galvanized steel or plastic. The anchor may also be coated with an anti-rust and weld spatter compound after its assembly.

With reference to FIGS. 9–12, two similar alternate embodiments for a lading tie anchor, designated 64, according to the present invention are shown in connection with a side wall or metal lining for an OEM application. Instead of a cutout being made in the lining (as shown in FIG. 3), a hexagonally-shaped dimple or indentation 37 is formed in the lining, the lading tie anchor being located in the dimple so as to be flush with the remainder of the metal liner. This is achieved by providing the back side of the anchor with a series of projections or stand-off legs 66 that protrude from the back side of the anchor. These stand-off legs may take different configurations. For example, in FIGS. 9 and 10, the stand-off legs are triangularly shaped; in FIGS. 11 and 12, the stand-off legs are peg-shaped.

In these embodiments, the anchor takes a "dog bone" shape with the anchoring post 68 having a pair of mounting ears or flanges 70a, 70b and 72a, 72b on each end that provide a welding surface 74 for securing the anchor to the dimple or indentation. As with the FIG. 4 embodiment, the anchor is preferably made of drop forged steel.

To facilitate the drainage of condensation that may form in the dimple behind the anchor, the anchoring post is cut out at 76 between each pair of the mounting flanges 70a, 70b and 72a, 72b. This cutout 76 provides a drainage port for any moisture trapped behind the anchor. While the cutout 76 is shown being arcuate in shape, it may take various other shapes, such as U-shaped or V-shaped. Note that the stand-off legs 66 are positioned astride the cutout 76 so that they do not inhibit any flow of liquid through the cutout. As can be appreciated, because the anchor has a drainage cutout 76 at each end, it has no "top" or "bottom." Thus it cannot be installed "upside down," with the drainage hole only at the top of the dimple.

A further embodiment of the present invention is shown in FIGS. 13–17A–G. This embodiment is substantially similar to the embodiment of FIGS. 4–8A–G, and the same reference numerals are used to denote the corresponding parts of the anchor. The primary differences in the two embodiments reside in the configuration of the locating tab 46, the shape of the perforations 62 in the backing plate 58, and the extent of the sloping shoulder 45a about the periphery of the anchor body 40.

Specifically, the locating tab 46 comprises forming the entire edge portion 42a in an arcuate shape. As with the FIG. 4 embodiment, the tab 46 assures proper orientation of the anchor 38 in a correspondingly-shaped cutout due to its asymmetry about its horizontal axis. Further, the perforations 62 in the backing plate 58 are in the shape of elongated slots and are two in number. Finally, the lip 45 has a sloping shoulder on each of the opposed edges 42a, 42b and 44a, 44b.

Thus, a lading tie anchor has been provided that meets all the objects of the present invention. While the anchor has been described in terms of certain specific embodiments, there is no intent to limit it to the same. Instead, the invention is defined by the scope of the following claims.

What is claimed is:

1. A lading tie anchor for use in an enclosed boxcar having a plurality of interior walls, at least one of said walls being generally vertically oriented and having an interior metal lining, the metal lining being adapted to receive the lading tie anchor, the lading tie anchor comprising:

a body having at least two opposed mounting surfaces for securing the anchor to the metal lining and defining a central opening therebetween, and a continuous, vertically-oriented anchoring post sized to span the central opening and connected to the opposed mounting surfaces, the anchoring post having an upper end and a lower ends the lower end of the anchoring post including an aperture to facilitate liquid transfer away from the anchor.

2. The lading tie anchor of claim 1 further comprising a backing plate secured to a body, the backing plate and anchoring post defining a slot for receiving the lading tie.

3. The lading tie anchor of claim 2 wherein the backing plate has a perforation there through.

4. The lading tie anchor of claim 3 wherein the backing plate includes a series of said perforations.

5. The lading tie anchor of claim 1 wherein the anchor includes a body having a continuous outer edge with a lip and angled shoulder formed therein for receiving an edge of the metal lining to thereby seat the anchor in the lining.

6. The lading tie-anchor-of claim 1 wherein the lading tie anchor is substantially flush with the metal lining.

7. The lading tie anchor of claim 2 wherein the body and backing plate are made of steel and coated with an anti-rust compound.

8. The lading tie anchor of claim 1 wherein the anchor includes a body having a plurality of stand off feet for properly locating the lading tie anchor with respect to the metal lining.

9. A lading tie anchor for use in an enclosed boxcar having a plurality of interior walls, at least one of said walls being generally vertically oriented and having an interior metal lining, with at least one generally U-shaped side post affixed to the exterior of the metal lining so as to define a generally vertical passageway, the metal lining having at least one aperture therein defining an edge in the metal lining, the aperture being enclosed by the side post and opening into the generally vertical passageway, the lading tie anchor comprising:

a one-piece body adapted to be received in the aperture in the metal lining, the body comprising at least two opposed edge A portions defining a central opening, the edge portions adapted to engage the edge in the aperture in the metal lining, and a continuous vertically-orientated anchoring post sized to span the central opening, the anchoring post having an upper end and a lower end, the lower end of the anchoring post including an aperture to facilitate liquid transfer from the body into the U-shaped side post.

10. The lading tie anchor of claim 9 further comprising a backing plate secured to the body, the backing plate and anchoring post defining a slot for receiving the lading tie.

11. The lading tie anchor of claim 10 wherein the backing plate includes at least one perforation.

12. The lading tie anchor of claim 9 wherein the body has a continuous outer edge with a lip and angled shoulder formed therein for receiving an edge of the metal lining to thereby seat the anchor in the lining.

13. The lading tie anchor of claim 9 wherein the lading tie anchor is substantially flush with the metal lining.

14. The lading tie anchor of claim 9 wherein the body and backing plate are made of steel and coated with an anti-rust compound.

* * * * *

UNITED STATES PATENT AND TRADEMARK OFFICE
CERTIFICATE OF CORRECTION

PATENT NO.    : 6,481,941 B2  Page 1 of 1
DATED         : November 19, 2002
INVENTOR(S)   : Ruduolph E. Nadherny and Peter R. Sutcliffe It is certified that error appears in the above-identified patent and that said Letters Patent is hereby corrected as shown below:

Column 6,
Line 5, delete "ends" and insert -- end, --.
Line 9, delete "a," and insert -- the --.
Line 40, delete "edge A" and insert -- edge --.

Signed and Sealed this

Twenty-second Day of July, 2003

JAMES E. ROGAN
*Director of the United States Patent and Trademark Office*